(12) United States Patent
Yamashita

(10) Patent No.: US 6,193,418 B1
(45) Date of Patent: Feb. 27, 2001

(54) SAFETY END CAP FOR ROTARY BEARING

(75) Inventor: Toru Yamashita, Kildeer, IL (US)

(73) Assignee: FYH Bearing Units USA, Inc., Schaumburg, IL (US)

( * ) Notice: Subject to any disclaimer, the term of this patent is extended or adjusted under 35 U.S.C. 154(b) by 0 days.

(21) Appl. No.: 09/484,270

(22) Filed: Jan. 18, 2000

(51) Int. Cl.[7] ................................................. F16C 17/24
(52) U.S. Cl. ............................ 384/489; 384/130; 384/624
(58) Field of Search ..................................... 384/489, 130, 384/477, 624, 537

(56) References Cited

U.S. PATENT DOCUMENTS 5,711,617 * 1/1998 Scheller ................................ 384/484
5,833,372 * 11/1998 Nisley ................................... 384/477

* cited by examiner

Primary Examiner—Lenard A. Footland
(74) Attorney, Agent, or Firm—Burns, Doane, Swecker & Mathis, LLP

(57) ABSTRACT

A bearing housing carries a bearing in which an end of a rotary shaft is to be mounted. A safety end cap is mounted to the housing to cover the shaft end. The end cap includes a cupshaped plastic body which has a circular front rim, and a pair of metal brackets slidably mounted in slits formed in the body behind the rim. Outer ends of the brackets are bent to engage side surfaces of the housing, and the end cap is permanently secured to the housing by rivets which extend through the brackets.

4 Claims, 2 Drawing Sheets

SAFETY END CAP FOR ROTARY BEARING

BACKGROUND OF THE INVENTION

The present invention relates to bearing assemblies and, in particular, to a safety end cap for a bearing housing.

Rotary shafts are generally mounted such that their ends are rotatably mounted in respective rotary bearings such as ball bearings, roller bearings, etc. For example, with reference to FIG. 4, a bearing 18 is mounted in an opening 14 of a bearing housing 10 of a conventional pillow block. A shaft end (not shown) would project through the bearing. In order to prevent personnel working near the shaft from being injured by the end of the rotating shaft, it is conventional to cover the shaft end by means of a safety end cap mounted on the bearing housing. One conventional type of end cap 10 shown in FIG. 5 is in the form of a plastic cup-shaped body that is attached to the housing so as to overlie the opening thereof and enclose the respective shaft end. The end cap 19 is inserted into a circular cavity 20 of the housing and includes integral stop tabs 21 that abut a front face 22 of the housing 10, and integral locking tabs 23 located at a front rim 24 of the end cap to secure the end cap within the recess 20 However, such end caps are susceptible to becoming removed from the housing, either intentionally, or accidentally, e.g., if a person should accidentally bump against the end cap. In that event, there arises a risk of injury since the rotatable shaft end is now exposed.

It is an object of the invention to minimize or obviate the above-described problem.

SUMMARY OF THE INVENTION

The above-described problem is solved by a bearing assembly which comprises a bearing housing that forms a circular cavity, an opening disposed in the cavity and adapted to receive a shaft, and a safety end cap for the housing. The end cap includes a cupped-shaped plastic body, a pair of metal brackets, and fasteners. The plastic body includes a front rim and is mounted on the housing such that the rim faces the housing coaxially with the opening. The body further includes a pair of diametrically opposite slits formed in the body behind the front rim. The brackets are slidably mounted in respective ones of the slits. Each bracket includes an inner portion disposed with the cup-shaped body, and an outer portion disposed outside of the cup-shaped body. An outer end of each outer portion is bent at a substantially right angle toward a plane of the rim. The outer portion engages a front surface of the housing, and the bent end engages a side surface of the housing. The fasteners extend through respective ones of the brackets for securing the brackets to the bearing housing.

The invention also pertains to the end cap per se.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 1:
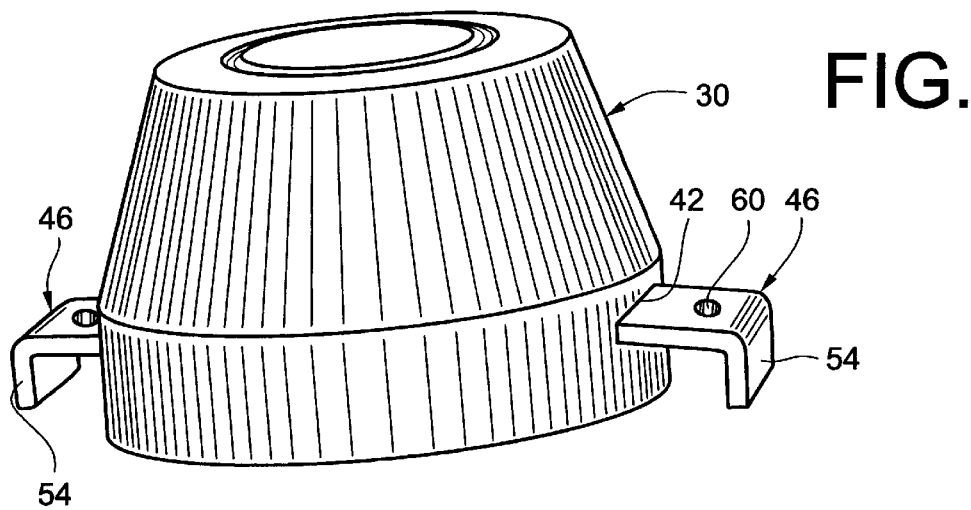
FIG. 1 depicts, in perspective, a bearing cover according to the present invention.
Figure 2:
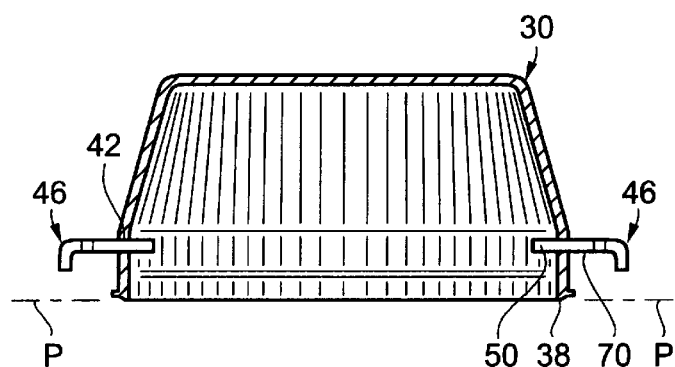
FIG. 2 is a longitudinal sectional view taken through the bearing.
Figure 3:
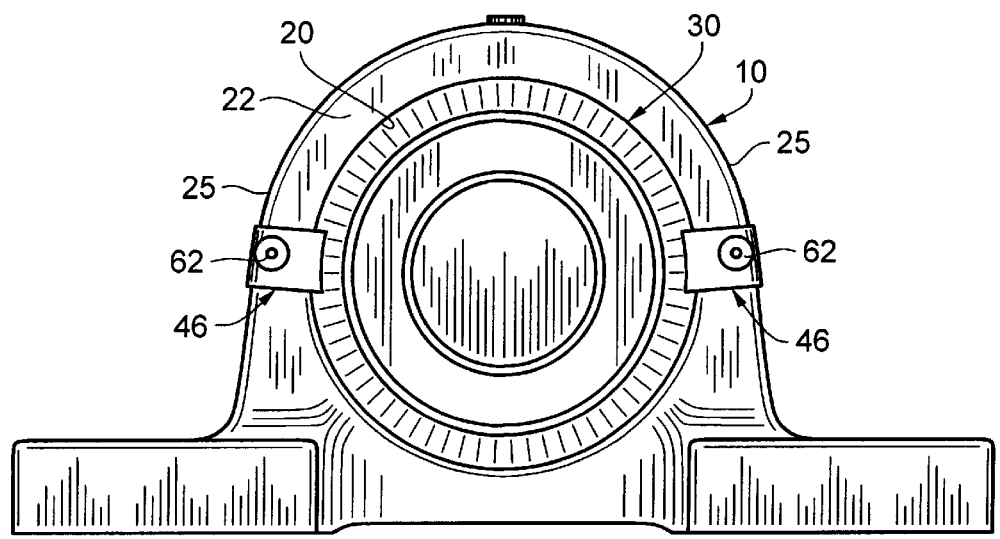
FIG. 3 is a side elevational view of a bearing housing with the bearing cover mounted thereon.
Figure 4:
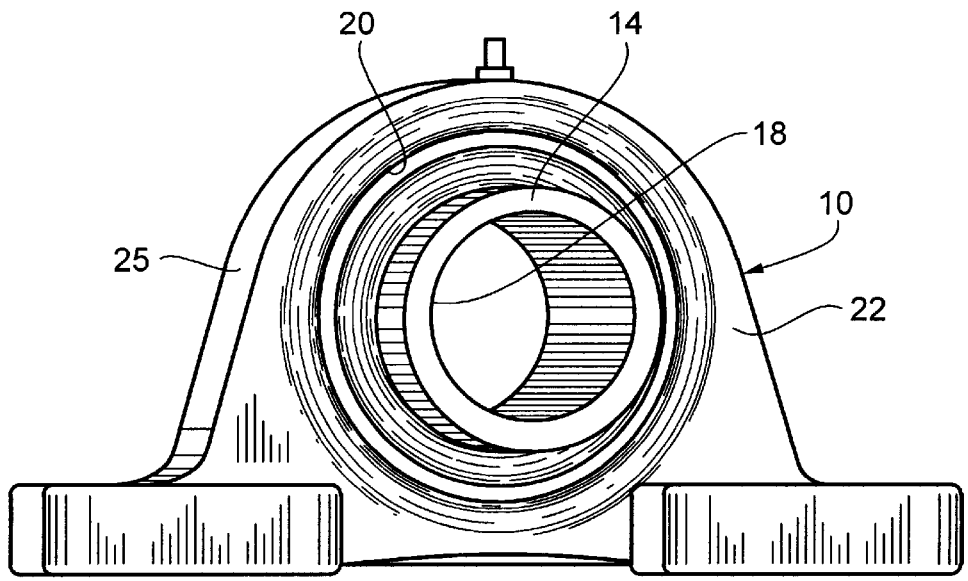
FIG. 4 is a front perspective view of a conventional bearing housing without a safety end cap.
Figure 5:
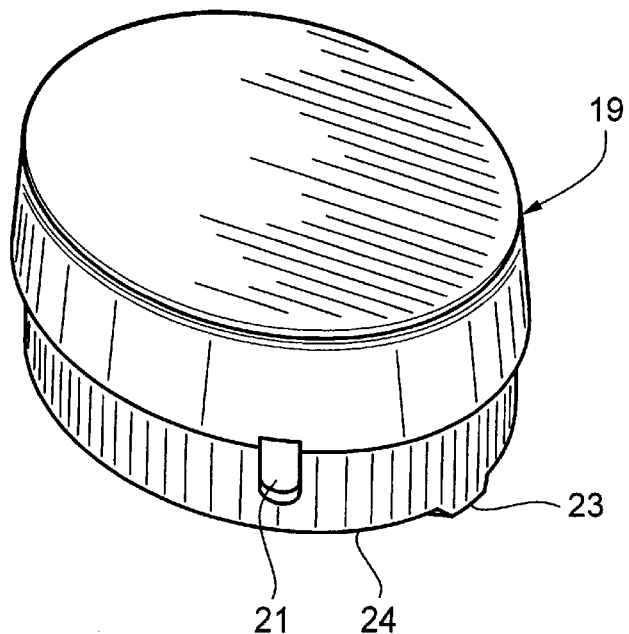
FIG. 5 is a perspective view of a prior art end cap.

Depicted in FIG. 4 is the bearing housing 10 to which has been installed a safety end cap 30 according to the present invention.

The end cap 30 comprises a plastic cup-shaped body 34 formed of any suitable material, preferably plastic. The body includes a circular front rim 38 and a pair of diametrically opposite slits 42 situated behind the rim 38. A pair of fixtures in the form of metal (e.g., stainless steel) brackets 46 are disposed in respective ones of the slits 42, whereby inner portions 50 of the brackets are disposed within the body 34, and outer portions of the brackets are disposed outside of the body 34.

The outer end 54 of each outer portion of the bracket is bent at a right angle toward a plane P of the rim 38. The brackets are slidable within their respective slits 42, so that the bent ends 54 can be brought into contact with respective side surfaces 25 of the housing.

Each bracket includes a through-hole 60 located to ensure that the through-hole will be situated outside of the body. The through-holes 60 enable the brackets to be secured to the housing 10 by fasteners, preferably non-removable fasteners 62, such as conventional blind rivets.

In practice, the safety end cap 30 is mounted by positioning the body 34 within the cavity 20 such that the rim 38 faces the housing coaxially with the opening 14. Forwardly facing surfaces 70 of the brackets 46 abut the front surface 22 of the housing. Then, the brackets 46 are slid within the slits 42 until the bent ends 54 of the brackets abut respective side surfaces 25 of the housing. Finally, the brackets are permanently secured to the housing by installing rivets 62 through the through-holes and into the housing.

By virtue of the invention, the safety end cap 30 ensures that the shaft end will not become exposed. That is, the end cap cannot become intentionally removed because the rivets are non-removable, and it cannot become dislodged by being bumped, because the bent ends 54 of the brackets resist sideways movement of the end cap.

While it would be possible, within the scope of the invention, to use removable fasteners such as screws to secure the brackets to the housing, it is preferred to use non-removable fasteners such as blind rivets to prevent even intentional removal of the safety end cap.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A bearing assembly comprising:

a bearing housing forming a cavity, an opening being disposed through the cavity and adapted to receive a rotary shaft; and a safety end cap including:

a cup-shaped plastic body including a front rim and a pair of diametrically opposite slits formed in the body behind the rim, the body mounted on the housing such that the rim is situated in the cavity, a pair of metal brackets slidably mounted in respective ones of the slits, each bracket including an inner portion disposed within the cup-shaped body, and an outer portion disposed outside of the cup-shaped body, a front surface of the outer portion abutting a front surface of the housing, an outer end of the outer portion being bent at an angle toward a plane of the rim and abutting a side surface of the housing, and fasteners extending through respective ones of the brackets and securing the brackets to the bearing housing.

2. The assembly according to claim 1 wherein the fasteners are removable.

3. The assembly according to claim 1 wherein the fasteners are non-removable.

4. A safety cap for bearings comprising:

a cup-shaped plastic body adapted to be mounted on a bearing housing, the body including a front rim and a pair of diametrically opposite slits formed in the body behind the rim, and a pair of metal brackets slidably mounted in respective ones of the slits, each bracket including an inner end disposed within the cup-shaped body and an outer end disposed outside of the cup shaped body, the outer end of the outer portion of each bracket being bent at an angle toward a plane of the rim, each bracket including a through-hole formed therein between the body and the outer end and adapted for receiving a fastener.

* * * * *